Jan. 13, 1953 H. A. PURSCHE 2,625,089
TWO-WAY PLOW
Filed March 31, 1948 4 Sheets-Sheet 1
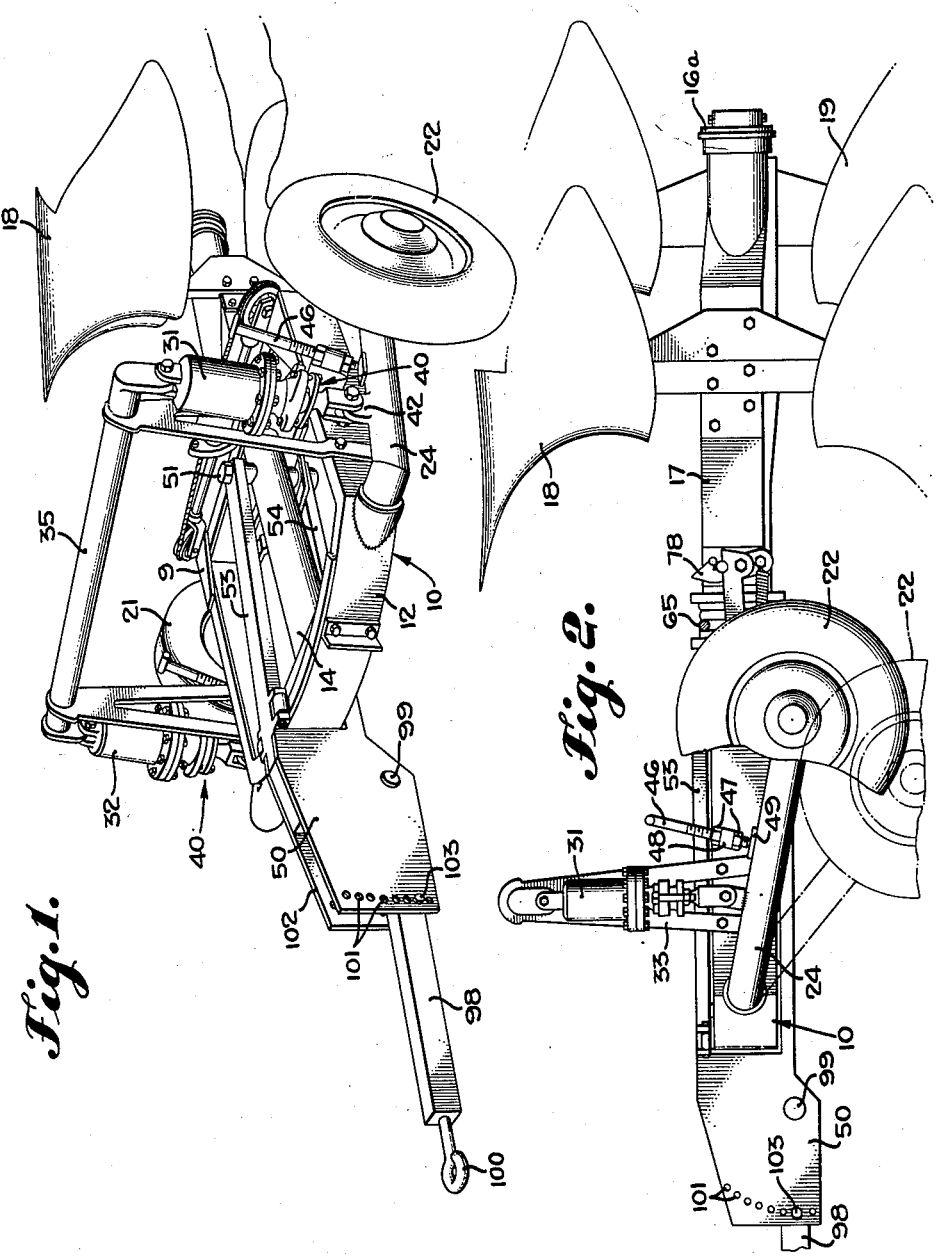
Harry A. Pursche,
INVENTOR.
BY Lyon & Lyon
ATTORNEYS Jan. 13, 1953  H. A. PURSCHE  2,625,089
TWO-WAY PLOW
Filed March 31, 1948  4 Sheets-Sheet 2
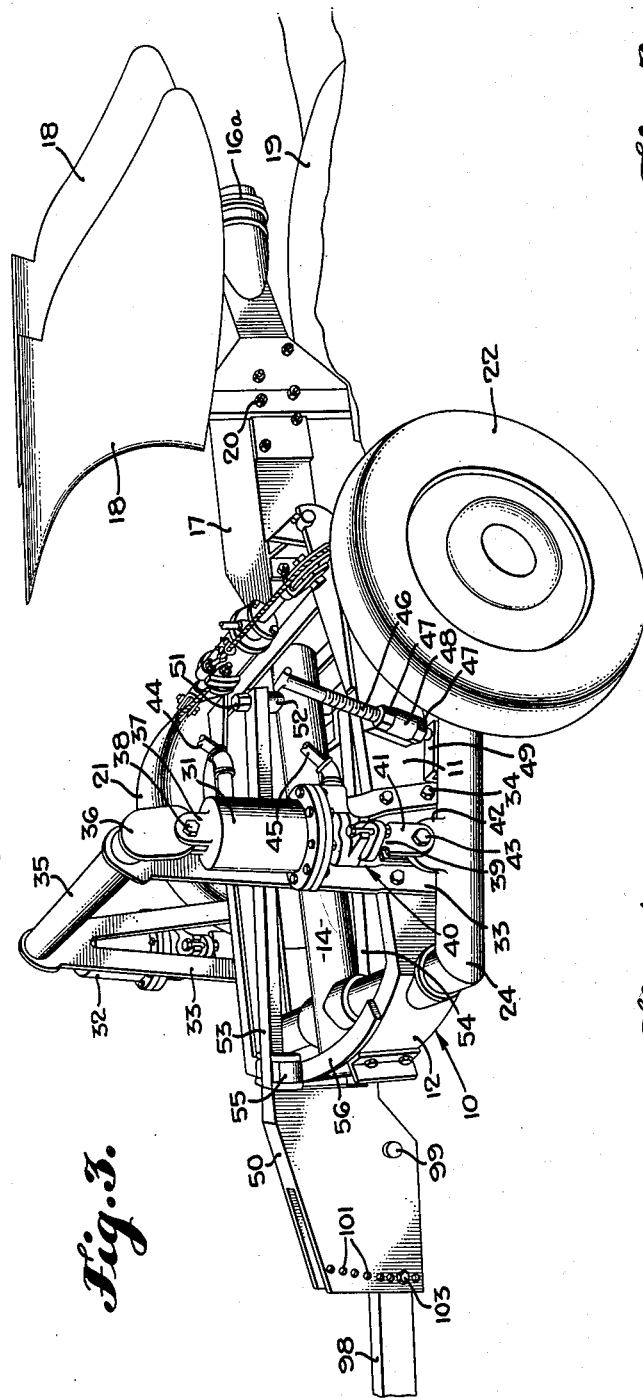
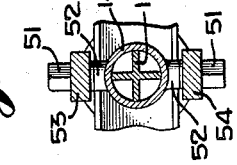
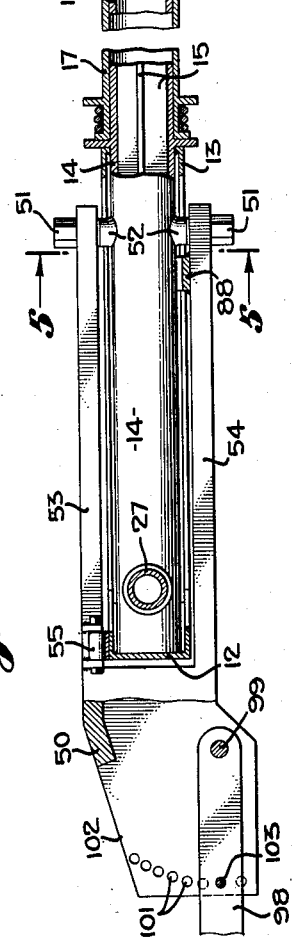
Harry A. Pursche,
INVENTOR.
BY Lyon & Lyon
ATTORNEYS

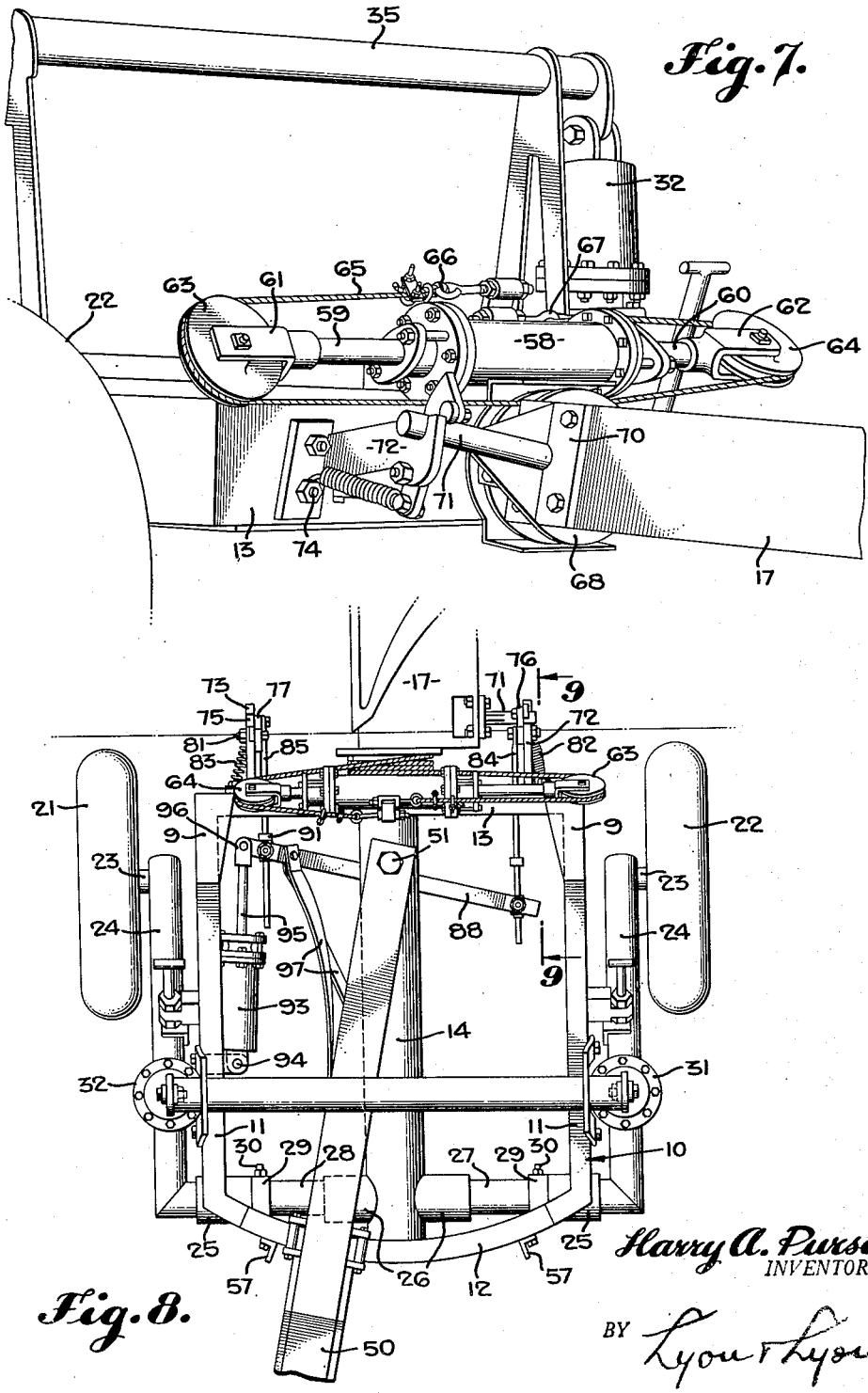

Jan. 13, 1953 H. A. PURSCHE 2,625,089
TWO-WAY PLOW
Filed March 31, 1948 4 Sheets-Sheet 4

Harry A. Pursche,
INVENTOR.

BY Lyon & Lyon
ATTORNEYS

Patented Jan. 13, 1953

2,625,089

UNITED STATES PATENT OFFICE 2,625,089

TWO-WAY PLOW

Harry A. Pursche, Gardena, Calif.

Application March 31, 1948, Serial No. 18,252

21 Claims. (Cl. 97—26)

1

This invention relates to agricultural implements and is particularly directed to improvements in a two way plow. The present invention relates generally to the type of plows illustrated in my co-pending applications, Serial No. 760,846, filed July 14, 1947, and Serial No. 780,417, filed October 17, 1947.

The principal object of the present invention is to provide an improved form of wheel support for the mobile frame of a two way plow assembly.

Another object is to provide a two way plow assembly having supporting wheels positioned at a location substantially to balance the plow assembly and thereby avoid the requirement of a tail wheel positioned on the carrier for the plow shares.

Another object is to provide a two way plow device having a pivoted draft tongue together with latches on the frame for securing the plow carrier in either of two operative positions, the latches being operated in accordance with the lateral position of the draft tongue.

Another object is to provide a new and improved wheel lowering device for the frame of a two way plow assembly.

Another object is to provide an improved form of apparatus for turning the plow carrier assembly from one position to the other.

A more particular object is to provide a double ended roll-over cylinder having sheave pulleys fixed at the outer ends of oppositely projecting piston rods and adapted for co-action with a cable wound around a drum provided on the carrier.

Other objects and advantages will appear hereinafter.

In the drawings:

Figure 1 is a perspective view showing a preferred embodiment of my invention and illustrating a two way plow with the left hand plow shares in operative position.

Figure 2 is a side elevation partly broken away.

Figure 3 is a perspective view showing details of mounting of the double ended roll-over cylinder assembly.

Figure 4 is a longitudinal sectional view partly broken away and showing details of the frame, tongue and carrier mountings.

Figure 5 is transverse sectional detail taken substantially on the lines 5—5 as shown in Figure 4.

Figure 7 is a perspective view showing details of a latching mechanism for maintaining the carrier in one of its two operative positions.

Figure 8 is a plan view partly broken away.

2

Figures 9, 10:
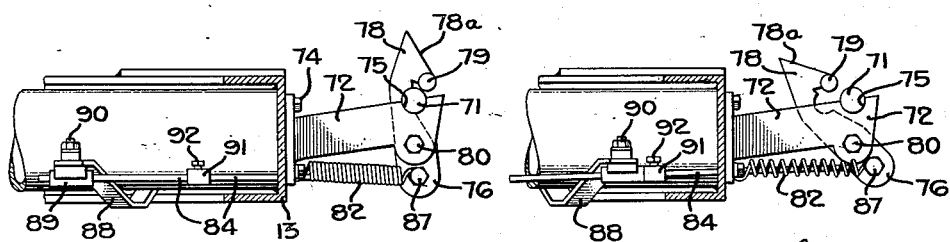
Figure 9 is a sectional detail taken substantially on the lines 9—9 as shown in Figure 8.
Figure 10 is a view similar to Figure 9 showing the latch in released position.
Figure 6:
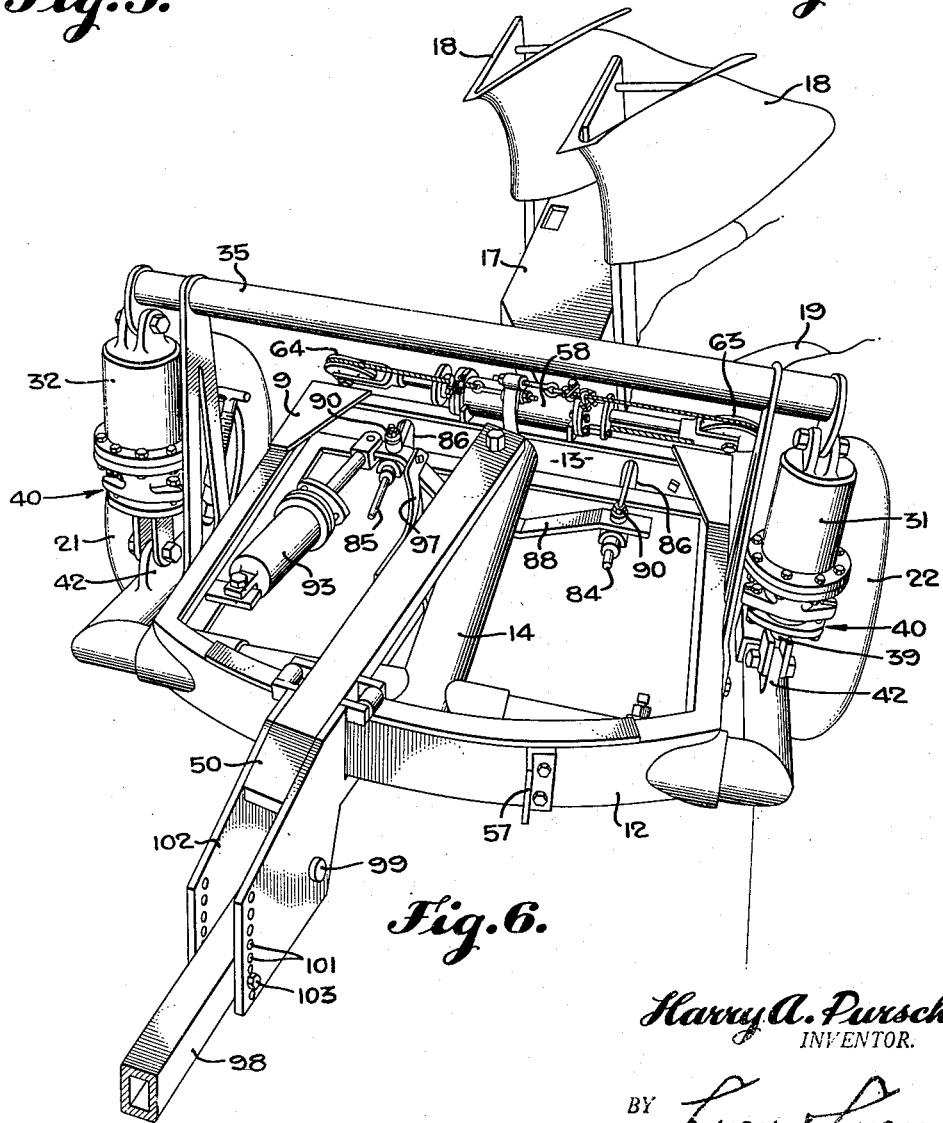
Figure 6 is a perspective view showing the mounting of the cross-bar for actuating the latches for the carrier.

Referring to the drawings, the frame generally designated 10 may include a pair of parallel side beams 11 joined at their forward ends by a curved beam 12 and at their rearward ends by a cross-beam 13. The beams 11, 12 and 13 may be secured together by any convenient means such as, for example, by welding. Suitable gussets 9 may be provided to stiffen the corner joints between the side beams 11 and the rear cross-beam 13. A central support beam 14 extends longitudinally of the frame 10. This support beam 14 may be welded at its forward end to the curved beam 12 and extends through the rear cross-beam 13. This central support beam 14 may be tubular in cross-section and stiffened by means of the internal reinforcements 15 as shown in Figure 5. The beam 14 projects rearwardly beyond the cross-beam 13 and thus provides a tubular support 16 for the carrier 17.

A plurality of right hand and left hand plows are secured to the carrier 17. These plows may be of any suitable or desirable type, and as shown comprise a pair of right hand plow shares 18 and a pair of left hand plow shares 19 releasably secured to the carrier by means of the bolts 20. It is recognized that other conventional types of plows such as disk plows can be employed if desired. A collar 16ª may be bolted to the end of the beam 14 to maintain the carrier 17 in operative position.

Ground engaging wheels 21 and 22 are provided on opposite sides of the frame 10, and each is carried on a stub shaft 23 mounted near the projecting end of a rearwardly extending arm 24. The arms 24 are pivotally mounted in stationary sleeves 25 fixed at the forward end of the frame 10. The sleeves 25 are axially aligned with the sleeves 26 which are fixed to the central support member 14. The pivot shafts 27 and 28 are fixed to the arms 24 and project inwardly through the sleeves 25 and into the sleeves 26. Collars 29 provided with set screws 30 afford a convenient means of preventing disassembly of the shafts 27 and 28 from the sleeves 25.

Means are provided for turning the arms about the axis of the pivot shafts 27 and 28, and as shown in the drawings this means includes a pair of power cylinders 31 and 32 mounted on opposite sides of the frame 10. An upright standard 33 is bolted to each of the parallel side beams 11 by means of the bolts 34, and a cross-brace 35 connects the upper ends of the standards 33. The brace 35 and standards may be joined by any convenient means such as by welding.

Downwardly extending tabs 36 are fixed to the outer projecting ends of the cross-brace 35 and are adapted to provide a support for the power cylinders 31 and 32. A clevis 37 formed on the upper end of each power cylinder is adapted to receive the tab 36 and to be pivotally connected therewith by means of the pivot bolts 38. A piston rod 39 extends downwardly from the cylinder 31 through a stuffing box assembly 40, and the piston rod 39 is provided with a clevis 41 at its lower end. The clevis is connected to the ear 42 on the arm 24 by means of the pivot bolt 43. Suitable hydraulic connections 44 and 45 are provided on the cylinder 31 for connection to hoses (not shown) communicating with a source of fluid under pressure. This source may be conveniently mounted on the tractor which tows the two way plow device.

From the above description it will be understood that when fluid pressure is admitted through the connection 44 and exhausted through the connection 45 the piston rod 39 is extended and the arm 24 is thereby caused to rotate in a clockwise direction, as viewed in Figures 1, 2 and 3. This action causes the frame 10 to raise relative to the supporting wheels 21 and 22. The power cylinder 32 and its associated mechanism connecting with its arm 24 need not be described in detail, since it is substantially a duplicate of the apparatus described in connection with the power cylinder 31. By positioning the power cylinders 31 and 32 in an upright position near the forward end of the frame 10, I am enabled to use relatively short stroke power cylinder assemblies and to apply forces to the crank arms 24 with a minimum amount of mechanical linkage.

Means are provided on the frame 10 for limiting the extent of movement of the arms 24 in a counterclockwise direction as viewed in Figures 1, 2 and 3. As shown in these views, this means includes a pair of screws 46 extending through aligned nuts 47 which are welded to a sleeve 48 carried on the side beams 11. A pad 49 is provided on each of the arms 24 in a position to contact the lower end of the screw 46. The depth of the furrow cut by the plow shares 18 and 19 may be controlled by the position of the screws 46. The deepest cut is made when the screw is retracted to its full extent. Furthermore, the screws 46 are useful when transporting the plow assembly preparatory to use. In such case the screws 46 are extended to hold the frame 10 at a relatively high elevation with respect to the supporting wheels 22. The plow assembly may be then transported with the plow shares clear of the ground level without requiring that the hydraulic fluid within the power cylinders 31 and 32 act to maintain the piston rods 39 in the extended position.

A draft tongue generally designated 50 is pivotally connected to the frame 10 by means of the pivot pins 51 received in bosses 52 provided on the central support beam 14 (see Figure 5). The tongue 50 is bifurcated to provide an upper bar 53 and a lower bar 54 which straddle the curved beam 12 and the central support beam 14. The pivot pins 51 serve to connect the extreme ends of the bars 53 and 54 in pivotal relationship with the central supporting beam 14. A pair of rollers 55 may be positioned on the draft tongue 50 and adapted to roll on the arcuate pad 56 provided on the upper surface of the curved beam 12. Limit stops 57 may be bolted to the beam 12 to limit the extent of lateral shifting movement of the draft tongue 50. The shifting of the draft tongue 50 enables the two way plow device to be properly positioned behind the towing vehicle, such as for example a tractor, in a manner so that the tractor remains on unplowed ground while one of the wheels 21 or 22 rolls in the furrow.

Means are provided for turning the carrier 17 with respect to the tubular support 16, and as shown in the drawings this means includes a hydraulic cylinder 58 positioned above the rear cross-beam 13 of the frame 10. This hydraulic cylinder 58 is double ended in that piston rods 59 and 60 extend outwardly from both ends of the cylinder. Each of the rods extends outwardly through a suitable stuffing box, and the rods are provided with clevises 61 and 62 carrying pulley sheaves 63 and 64. A flexible cable 65 has one end secured at 66 and the other end secured at 67. Between these ends the cable extends over the sheaves 63 and 64 and around the drum 68 provided on the carrier 17. Suitable hydraulic connections are provided on the power cylinder 58 for introducing hydraulic fluid into either end thereof. Accordingly, when the piston rod 59 is extended and the piston rod 60 is retracted, the carrier is rotated in a direction to bring the left hand plow shares 19 into operative position. This position is shown in Figure 7. It will be understood that a relatively short stroke of the piston rods 59 and 60 is sufficient to rotate the carrier 17 through approximately one-half revolution by reason of the multiplying effect of the sheaves 63 and 64. Thus, for each inch of movement of the piston rods 59 and 60, two inches of cable is spooled on and off the drum 68.

Means are provided for limiting the extent of rotary movement of the carrier 17 and plow shares 18 and 19, and as shown in the drawings this means includes a bracket 70 bolted to the carrier 17 and provided with an outwardly extending latching lug 71. Laterally spaced brackets 72 and 73 are fixed to the rear cross-beam 13 of the frame 10 by means of the bolts 74, and these brackets are provided with upwardly facing recesses 75 adapted to receive the latching lug 71. The bracket 72 acts as a limit stop for the latching lug 71 when the left hand plow shares 19 are in operative position, and the bracket 73 acts as a limit stop for the latch lug 71 when the right hand plow shares 18 are in operative position.

Latching means are provided for maintaining the carrier 17 and plow shares in either of the two operative positions. As shown in the drawings, this means includes a pair of pivotally mounted latches 76 and 77. Each of these latches 76 and 77 is provided with a nose piece 78 having a roller 79. The latch 76 is pivotally mounted on the bracket 72 by means of the pivot bolt 80, and the latch 77 is pivotally mounted on the bracket 73 by means of the pivot bolt 81. Tension springs 82 and 83 are provided for normally urging the nose pieces 78 to move in a direction to overlie the latching lug 71. The upper surfaces 78a of the nose pieces 78 are inclined in order that when contacted by the latching lug 71 they may serve to pivot the latches 76 and 77 to inoperative positions against the action of the tension springs 82 and 83.

Release bars 84 and 85 are provided for moving the latches 76 to an inoperative position. These bars extend through apertures 86 provided in the rear cross-beam 13, and each is pivotally connected at one end to its respective latch by means of a bolt 87. A cross-bar 88 is fixed to the lower bar 54 of the draft tongue 50. Accordingly, when the tongue 50 shifts laterally the cross-bar 88 moves about the axis of the tongue pivot 51. Sleeves 89 are mounted for sliding movement on the rods 84 and 85, and these sleeves are pivotally secured to the outer ends of the cross-bar 88 by means of the pivot bolts 90. A collar 91 having a set screw 92 is provided for each of the bars 84 and 85. This collar is fixed on its respective bar by means of the set screw 92.

As shown in Figures 9 and 10, when the cross-bar 88 pivots with the draft tongue in one direction the sleeve 89 sliding on the rod 84 contacts the fixed collar 91 and thereby causes the rod 84 to move the latch 76 to unlatched position against the action of the tension spring 82. When the cross-bar 88 returns to its original position the spring 82 moves the latch 76 into latching position. Similarly, when the cross-bar 88 is shifted in a clockwise direction as viewed in Figure 8, the collar 91 on the rod 85 is contacted, and consequently the latch 77 is moved to inoperative position against the action of the tension spring 83.

Means are provided for shifting the draft tongue 50 between the limit stops 57. As shown in the drawings, this means includes a power cylinder 93 pivotally connected to the frame at 94 and provided with a piston rod 95. A clevis 96 is pivotally connected to the extreme outer end of the cross-bar 88 so that actuation of the cross-bar serves to shift the position of the tongue 50. One or more angle braces 97 may be provided for connecting the cross-bar 88 with the upper and lower bars 53 and 54 of the draft tongue 50.

In my co-pending applications above referred to the carrier for the plow shares is provided with a tail wheel rolling on unplowed ground. A similar construction may be employed in connection with my present invention if desired, but in order to reduce weight and to minimize the over-all length of the assembly I prefer to omit the tail wheel and to position the supporting wheels 21 and 22 near the center of gravity of the plow device. The weight and the position of the carrier 17 and plow shares 18 and 19 is such that if balance is to be achieved the supporting wheels 21 and 22 must be positioned near the location of the cross-beam 13 on the frame 10. Accordingly, it is important in the construction embodying my present invention to pivot the supporting arms for the wheels near the forward end of the frame in order that when the frame is raised to bring the plow shares clear of the ground there will be adequate clearance between the wheels and forward plow shares to permit turning movement of the carrier, thereby bringing either set of plow shares into operative position. As shown in Figure 2 the supporting wheels move forwardly with respect to the frame when the frame is raised, and in this way adequate clearance is provided for the extreme forward ends of the plow shares in rotating with the carrier from one operative position to the other.

The draft tongue 50 is preferably provided with a link 98 pivotally connected to the tongue structure by means of the pin 99. The usual eye bolt 100 may be provided at the forward end of the link 98. If a tail wheel is to be employed on the carrier 17 a limited arcuate movement of the link 98 with respect to the remainder of the draft tongue 50 should be permitted in order that the plow assembly may be supported on three wheels independently of the towing tractor. When the tail wheel is omitted, however, it is necessary to fix the tongue link 98 with respect to the remainder of the draft tongue 50. I prefer to provide a series of aligned apertures 101 in the plates 102, and these apertures 101 extend in an arc about the pivot 99. A connecting bolt 103 may be inserted through an opening in the link 98 to fix the link at any desired angular position with respect to the plates 102 in order to accommodate the plow device to any one of various towing tractors which may have drawbars positioned at different elevations. If a tail wheel is employed the link 98 is not fixed with respect to the plates 102 but is permitted to have limited arcuate movement about the pin 99 between limits defined by bolts 103 extending through aligned apertures in the plates 102. In the latter event sleeves may be provided to encircle the bolts between the plates 102 in order to maintain correct spacing of the plates when the bolts are tightened.

The hydraulic lines leading to the power cylinders 31, 32, 58 and 93 have been omitted from the drawings for clarity of illustration. These hydraulic lines may extend to a hydraulic pump provided on the towing vehicle in a manner illustrated in connection with my co-pending applications above referred to. The power cylinders 31 and 32 for raising and lowering the supporting wheels 21 and 22 may be connected to the same hydraulic lines, while the power cylinders 58 and 93 also may be connected to another set of hydraulic lines, so that shifting of the draft tongue 50 is accompanied by turning of the carrier 17 about the central supporting beam 14. The controls for the hydraulic lines are preferably mounted on the tractor for convenient operation by the tractor operator.

The operation of the two way plow is similar to that described in connection with my co-pending applications. The plow device is transported to the field where it is to be used. The screws 46 are then retracted to set the desired depth of the furrow. The supporting wheels then assume the position shown in Figure 3 of the drawings, and upon forward motion of the plow one of the sets or gangs of plow shares is engaged with the soil. The carrier 17 is maintained in position by means of the latch 76 in its cooperative engagement with the latching lug 71. A furrow is plowed lengthwise of the field and the wheels 21 and 22 are lowered to raise the frame and thereby bring the operative plow shares out of the ground. The tractor and plow device are then turned around at the end of the field and the power cylinders 58 and 93 are actuated to turn the carrier to bring the other plow gang into position, and to shift the tongue laterally in order that the plow device shall be properly positioned behind the tractor. The latch 77 then cooperates with the latching lug 71 to maintain the carrier 17 in proper position. When the hydraulic pressure is released from the power cylinders 31 and 32, the frame 10 descends to engage the operative plow gang with the soil.

While I have shown and described a pair of right hand plow shares and a pair of left hand plow shares, it is to be understood that a single right hand plow and a single left hand plow may be employed if desired, or that a larger number of plows may be employed in each gang.

It will be observed that the supporting wheels which roll in the furrow and on the unplowed ground rotate about an axis which is inclined, since the frame 10 is tilted during operation of either of the plow gangs by reason of the wheel rolling in the furrow. The tilt of the wheel in the furrow and the tilt of the wheel rolling on the unplowed ground are effective in resisting side thrust imposed on the plow frame by the action of the plow shares in turning over the earth. This pitch or inclination of the wheels is also effective in counterbalancing the side pull of the tractor by reason of the shifted position of the draft tongue 50. These considerations are particularly important in connection with the plow device illustrated in the drawings, since no tail wheel is employed for supporting the rearward portion of the carrier 17.

Having fully described my invention, it is to be understood that I do not wish to be limited to the details herein set forth, but my invention is of the full scope of the appended claims.

I claim:

1. In a two way plow assembly, the combination of a frame having laterally spaced side members; a carrier extending rearwardly from the frame and provided with a right-hand plow and a left-hand plow; means on the frame for turning the carrier about a longitudinal axis to bring either plow into operative position; a pair of laterally spaced supporting wheels on opposite sides of the frame; rearwardly extending arms pivotally mounted on the forward ends of the side members, the arms extending for the major portion of the length of the side members; means connecting the rearward ends of said arms to said supporting wheels; and upright power cylinder assemblies on the frame for effecting pivotal movement of the arms downwardly and forwardly relative to the frame, whereby the wheels move forwardly away from the carrier when the frame is raised, said power cylinder assemblies each engaging one of the wheel arms at a location between the wheel and the pivotal connection to one of the side members.

2. In a two way gang plow assembly, the combination of a frame having laterally spaced side members; a carrier extending rearwardly from the frame and provided with a gang of right-hand plows and a gang of left-hand plows; means on the frame for turning the carrier about a longitudinal axis to bring either plow gang into operative position; a pair of laterally spaced supporting wheels on opposite sides of the frame alternately adapted to roll in a furrow; rearwardly extending arms pivotally mounted on the forward ends of the side members, the arms extending for the major portion of the length of the side members; means connecting the rearward ends of said arms to said supporting wheels; and upright power cylinder assemblies on the frame for effecting pivotal movement of the arms downwardly and forwardly relative to the frame, whereby the wheels move forwardly away from the carrier when the frame is raised to provide clearance for rotating the carrier and plow gangs, said power cylinder assemblies each engaging one of the wheel arms at a location between the wheel and the pivotal connection to one of the side members.

3. In a two way plow assembly, the combination of a frame; a support beam on the frame extending rearwardly therefrom; a draft tongue connected to the frame and extending forwardly therefrom; a carrier turnably mounted on the support beam and provided with a right-hand plow and a left-hand plow; means on the frame for turning the carrier about the support beam to bring either plow into operative position; a pair of laterally spaced ground contacting wheels on opposite sides of the frame and positioned near the center of gravity of the plow assembly; rearwardly extending arms pivotally mounted on the forward portion of the frame; means connecting the rearward ends of said arms to said supporting wheels; and power means on the frame for effecting pivotal movement of the arms downwardly and forwardly relative to the frame, whereby the frame may be raised.

4. In a two way plow assembly, the combination of a frame; a support beam on the frame extending rearwardly therefrom; a draft tongue pivotally connected to the frame and extending forwardly therefrom; a carrier turnably mounted on the support beam and provided with a right-hand plow and a left-hand plow; means on the frame for turning the carrier about the support beam to bring either plow into operative position; a pair of laterally spaced ground contacting wheels on opposite sides of the frame and positioned near the center of gravity of the plow assembly; rearwardly extending arms pivotally mounted on the forward portion of the frame in advance of the pivotal connection for the draft tongue; means connecting the rearward ends of said arms to said supporting wheels; and power means on the frame for effecting pivotal movement of the arms downwardly and forwardly relative to the frame, whereby the frame may be raised.

5. In a two way gang plow assembly, the combination of a frame; a carrier extending rearwardly from the frame and provided with a right-hand plow gang and a left-hand plow gang; a draft tongue pivotally connected to the frame and extending forwardly therefrom; power means on the frame for turning the carrier about a longitudinal axis to bring either plow into operative position; a pair of laterally spaced supporting wheels on opposite sides of the frame and positioned near the center of gravity of the plow assembly; rearwardly extending arms pivotally mounted on the forward portion of the frame; means connecting the rearward ends of said arms to said supporting wheels; and power means on the frame for effecting pivotal movement of the arms downwardly and forwardly relative to the frame, whereby the wheels move forwardly away from the carrier when the frame is raised to provide clearance for rotating the carrier and plow gangs.

6. In a two way plow assembly the combination of a frame; a carrier extending rearwardly from the frame and provided with a right-hand plow and a left-hand plow; power means on the frame for turning the carrier about a longitudinal axis to bring either plow into operative position; a pair of laterally spaced supporting wheels on opposite sides of the frame alternately adapted to roll in a furrow; rearwardly extending arms pivotally mounted on the forward portion of the frame; means connecting the rearward ends of said arms to said supporting wheels; and separate power means on the frame engaging each of the arms between the ends thereof for effecting pivotal movement of each of the arms downwardly and forwardly relative to the frame, whereby the wheels move forwardly away from the carrier when the frame is raised to provide clearance for rotating the carrier and plows.

7. In a two way plow assembly, the combination of a frame; a carrier extending rearwardly from the frame and provided with a right-hand plow and a left-hand plow; power means on the frame for turning the carrier about a longitudinal axis to bring either plow into operative position; a pair of laterally spaced supporting wheels on opposite sides of the frame; a draft tongue pivotally connected to the frame for horizontal swinging movement and extending forwardly therefrom; latch means for releasably securing the carrier in either operative position; and means including an actuator element attached to the draft tongue adapted to actuate the latch means in accordance with the lateral position of the draft tongue.

8. In a two way plow assembly, the combination of a frame; a carrier extending rearwardly from the frame and provided with a right-hand plow and a left-hand plow; power means on the frame for turning the carrier about a longitudinal axis to bring either plow into operative position; a draft tongue pivotally connected to the frame and extending forwardly therefrom; power means on the frame adapted to shift the tongue laterally about its pivotal connection; latch means for releasably securing the carrier in either position; and means including an actuator element attached to the draft tongue adapted to actuate the latch means in accordance with the lateral position of the draft tongue.

9. In a two way plow assembly, the combination of a frame; a carrier extending rearwardly from the frame and provided with a right-hand plow and a left-hand plow; power means on the frame for turning the carrier about a longitudinal axis to bring either plow into operative position; a draft tongue pivotally connected to the frame at a rearward portion thereof, said tongue extending forwardly from the frame; a cross-bar fixed relative to the tongue; power means carried on the frame and operatively connected to the cross-bar, whereby the tongue may be shifted laterally with respect to the frame; laterally spaced latches on the frame, each adapted to releasably secure the carrier in one of its operative positions; and mechanical linkage means operatively connected to the cross bar for actuation of the latches in accordance with the lateral position of the draft tongue.

10. In a two way plow assembly, the combination of a frame; a carrier extending rearwardly from the frame and provided with a right-hand plow and a left-hand plow; power means on the frame for turning the carrier about a longitudinal axis to bring either plow into operative position; a draft tongue pivotally connected to the frame at a rearward portion thereof, said tongue extending forwardly from the frame; a cross-bar fixed relative to the tongue; power means carried on the frame and operatively connected to the cross-bar, whereby the tongue may be shifted laterally with respect to the frame; a laterally projecting lug on the carrier; laterally spaced latches on the frame, each adapted to releasably secure the lug to maintain the carrier in one of its operative positions; and mechanical linkage means operatively connected to the cross bar for actuation of the latches in accordance with the lateral position of the draft tongue.

11. In a two way plow assembly, the combination of a frame; a carrier extending rearwardly from the frame and provided with a right-hand plow and a left-hand plow; power means on the frame for turning the carrier about a longitudinal axis to bring either plow into operative position; a draft tongue pivotally connected to the frame at a rearward portion thereof, said tongue extending forwardly from the frame; a cross-bar fixed relative to the tongue; power means carried on the frame and operatively connected to the cross-bar, whereby the tongue may be shifted laterally with respect to the frame; laterally spaced limit stops mounted on the frame each adapted to arrest rotation of the carrier in one of its operative positions; releasable latch means associated with each of said limit stops; and mechanical linkage means operatively connected to the cross bar for actuation of the latches in accordance with the lateral position of the draft tongue.

12. In a two way plow assembly, the combination of a frame; a carrier extending rearwardly from the frame and provided with a right-hand plow and a left-hand plow; means on the frame for turning the carrier about a longitudinal axis to bring either plow into operative position; a pair of laterally spaced supporting wheels on opposite sides of the frame; arms pivotally mounted on the frame; means connecting the extending end of each arm to one of said supporting wheels; upright standards on the frame; pivot means on each arm intermediate the ends thereof; and upright power cylinder assemblies each operatively interposed between the pivot means on one of said arms and the upper portion of one of said standards for pivoting the arms relative to the frame.

13. In a two way plow assembly, the combination of a frame; a carrier extending rearwardly from the frame and provided with a right-hand plow and a left-hand plow; means on the frame for turning the carrier about a longitudinal axis to bring either plow into operative position; a pair of laterally spaced supporting wheels on opposite sides of the frame; arms pivotally mounted on the frame; means connecting the extending end of each arm to one of said supporting wheels; upright standards on the frame; pivot means on each arm intermediate the ends thereof; a cross brace extending transversely of the frame and joining the upper ends of the standards; and power cylinder assemblies each operatively interposed between the pivot means on one of said arms and the upper portion of one of said standards for pivoting the arms relative to the frame.

14. In a two way plow assembly, the combination of a frame; a carrier extending rearwardly from the frame and provided with a right-hand plow and a left-hand plow, means on the frame for turning the carrier about a longitudinal axis to bring either plow into operative position; a pair of laterally spaced supporting wheels on opposite sides of the frame; arms pivotally mounted on the frame for movement about a common axis; means connecting the extending end of each arm to one of said supporting wheels; pivot means on each arm intermediate the ends thereof; upright standards on the frame; and power cylinder assemblies each operatively interposed between one end of the cross brace and the pivot means on one of said arms for pivoting the arms relative to the frame.

15. In a two way plow assembly, the combination of a frame having parallel side members; a carrier extending rearwardly from the frame and provided with a right-hand plow and a left-hand plow; means on the frame for turning the carrier about a longitudinal axis to bring either plow into operative position; a pair of laterally spaced supporting wheels on opposite sides of the frame; rearwardly extending arms pivotally mounted on the frame at the forward ends of the side members for movement about a common axis, the arms extending for a major portion of the length of the side members; means connecting the extending end of each arm to one of said supporting wheels; upright standards on the side members of the frame; a cross brace extending transversely of the frame and joining the upper ends of the standards; and power cylinder assemblies each pivotally connected to the cross brace at one end and to one of said arms at the other end at a location between said axis and the wheel, whereby the arms may be pivoted relative to the frame.

16. In a two way plow assembly, the combination of a frame having parallel side members; a carrier extending rearwardly from the frame and provided with a right-hand plow and a left-hand plow; means on the frame for turning the carrier about a longitudinal axis to bring either plow into operative position; a pair of laterally spaced supporting wheels on opposite sides of the frame; arms pivotally mounted on the frame, the arms extending for a major portion of the length of the side members; means connecting each arm to one of said supporting wheels; means for pivoting the arms relative to the frame, said means including an upright structure including standard members on the side members of the frame and a cross brace member extending transversely of the frame and joining the upper ends of the standard members, and power cylinder assemblies operatively interposed between each of said arms and the said upright structure.

17. In a two way plow assembly, the combination of: a frame having side members, a carrier extending rearwardly from the frame and provided with a right-hand plow and a left-hand plow, power means on the frame for turning the carrier about a longitudinal axis to bring either plow into operative position, a laterally projecting lug on the forward end of the carrier, a pair of latching elements carried on the frame and each positioned adjacent the rear end of one of the side members, the latching elements being engageable with said lug for holding the carrier in either operative position, a draft tongue pivotally connected to the frame for horizontal swinging movement, and means including an actuator element attached to the draft tongue for actuating said latching elements in accordance with the lateral position of the draft tongue.

18. In a two way plow assembly, the combination of a frame; a carrier extending rearwardly from the frame and provided with ground-engaging plow means for producing either a right-hand furrow or a left-hand furrow; power means on the frame for turning the carrier to either of two operative positions relative to the frame to cause the plow means to produce a right-hand furrow or a left-hand furrow as desired; a pair of laterally spaced supporting wheels on opposite sides of the frame; a draft tongue pivotally connected to the frame for horizontal swinging movement and extending forwardly therefrom; latch means for releasably securing the carrier in either operative position; and means including an actuator element attached to the draft tongue adapted to actuate the latch means in accordance with the lateral position of the draft tongue.

19. In a two way plow assembly, the combination of a frame; a carrier extending rearwardly from the frame and provided with ground-engaging plow means for producing either a right-hand furrow or a left-hand furrow; power means on the frame for turning the carrier to either of two operative positions relative to the frame to cause the plow means to produce a right-hand furrow or a left-hand furrow as desired; a draft tongue pivotally connected to the frame and extending forwardly therefrom; power means on the frame adapted to shift the tongue laterally about its pivotal connection; latch means for releasably securing the carrier in either position; and means including an actuator element attached to the draft tongue adapted to actuate the latch means in accordance with the lateral position of the draft tongue.

20. In a two way plow assembly, the combination of a frame; a carrier extending rearwardly from the frame and provided with ground-engaging plow means for producing either a right-hand furrow or a left-hand furrow; power means on the frame for turning the carrier to either of two operative positions relative to the frame to cause the plow means to produce a right-hand furrow or a left-hand furrow as desired; a draft tongue pivotally connected to the frame at a rearward portion thereof, said tongue extending forwardly from the frame; a cross-bar fixed relative to the tongue; power means carried on the frame and operatively connected to the cross-bar, whereby the tongue may be shifted laterally with respect to the frame; laterally spaced latches on the frame, each adapted to releasably secure the carrier in one of its operative positions; and mechanical linkage means operatively connected to the cross-bar for actuation of the latches in accordance with the lateral position of the draft tongue.

21. In a two way plow assembly, the combination of a frame; a carrier extending rearwardly from the frame and provided with ground-engaging plow means for producing either a right-hand furrow or a left-hand furrow; power means on the frame for turning the carrier to either of two operative positions relative to the frame to cause the plow means to produce a right-hand furrow or a left-hand furrow as desired; a draft tongue pivotally connected to the frame at a rearward portion thereof, said tongue extending forwardly from the frame; a cross-bar fixed relative to the tongue; power means carried on the frame and operatively connected to the cross-bar, whereby the tongue may be shifted laterally with respect to the frame; a laterally projecting lug on the carrier; laterally spaced latches on the frame, each adapted to releasably secure the lug to maintain the carrier in one of its operative positions; and mechanical linkage means operatively connected to the cross-bar for actuation of the latches in accordance with the lateral position of the draft tongue.

HARRY A. PURSCHE.

REFERENCES CITED

The following references are of record in the file of this patent:

UNITED STATES PATENTS

| Number | Name | Date |
|---|---|---|
| 677,495 | Bilz | July 2, 1901 |
| 714,570 | Fowler et al. | Nov. 25, 1902 |
| 1,243,072 | Juran | Oct. 16, 1917 |
| 2,079,595 | Collins | May 11, 1937 |
| 2,153,824 | Collins | Apr. 11, 1939 |
| 2,188,413 | Markel | Jan. 30, 1940 |
| 2,195,631 | Post et al. | Apr. 2, 1940 |
| 2,219,478 | Gurries | Oct. 29, 1940 |
| 2,429,463 | Hurlimann | Oct. 21, 1947 |
| 2,469,622 | Acton | May 10, 1949 |

FOREIGN PATENTS

| Number | Country | Date |
|---|---|---|
| 556,073 | France | Apr. 26, 1923 |
| 770,966 | France | July 16, 1934 |